Patented Nov. 23, 1948

2,454,717

UNITED STATES PATENT OFFICE

2,454,717

MODIFIED ALKYD SIZING COMPOSITION

John W. Robertson, Englewood, N. J., assignor, by direct and mesne assignments, of one-half to Ellis-Foster Company, a corporation of New Jersey, and one-half to Montclair Research Corporation, a corporation of New Jersey No Drawing. Application December 11, 1945, Serial No. 634,412

2 Claims. (Cl. 260—22)

This invention relates to a resinous composition for treating jute fibers where it is desired to change the character of the fibers to achieve certain results such as sizing or bodying with water-insoluble materials, to increase strength and wear-resistance, and to impart heat-sealing qualities to a woven structure made wholly of the jute fiber or of a combination of jute and other untreated fibers, such as a rug backing. Resins for this use are preferably applied in emulsion form to reduce costs and aid in controlling penetration into the fiber and should be easily emulsifiable. The resins themselves must be made of very low cost materials and by simple processes to fit the economic demand.

An object of the invention is to provide a low-cost resinous composition suitable for emulsification and application to jute fibers to impart sizing, reinforcing and heat sensitive properties thereto and which dries to a non-tacky film on the fibers to render them heat-sealable at any desired stage in the manufacture of products from the treated fibers.

This and other objects are achieved by means of a resinous composition consisting of tallow, the gasoline-insoluble resinous extract of pinewood and an alkyd resin obtained by reacting phthalic anhydride, glycerol and tall oil. Tall oil is an oily waste material of the paper industry and consists of resin acids, higher fatty acids and an unsaponifiable portion largely sterolic in nature. While different samples vary slightly in acid number, the average molecular weight for purposes of comparison may be taken as 300. The pinewood extract is a cheap by-product obtained by extracting pinewood with an aromatic hydrocarbon, removing the solvent and volatile extracts from the solution thus obtained and separating the residue into the gasoline-soluble portion which is rosin, and the gasoline-insoluble portion. A commercial product obtained in this way from long leaf yellow pine stumps is sold under the name of Vinsol and the resinous extract used herein will be referred to by that name. Any of the commercial grades of tallow (beef, mutton, etc.) is suitable or stearin pitch may be substituted therefor.

In the resinous composition of the present invention, the Vinsol acts as a hardener and also renders the composition easily emulsifiable. The tallow tends to counteract too much hardening by the Vinsol, which is a hard brittle resin; it also reduces the tackiness of the resinous composition which is usually desirable. These resinous compositions are easily and cheaply prepared in that the raw materials are cheap and the process for making them is simple, consisting of a straight cooking procedure in an ordinary alkyd resin kettle or even in an open kettle. The resins are readily emulsified with the usual emulsifying and stabilizing agents such as triethanolamine oleate and casein products.

The tall oil alkyd resin is preferably the reaction product of 1 mole phthalic anhydride, 3/4 to 2 moles glycerol and 1/2 to 1 1/2 moles tall oil. Glycerol is used in slight excess in order to render the resin more easily emulsifiable. Tallow is not soluble if the resin contains less than 1/2 mole tall oil and, on the other hand, resins containing more than 1 1/2 moles tall oil require so much Vinsol and tallow to keep them from being too soft that the resulting resin is rather weak and crumbles too readily to have much usefulness in the fiber treating process.

The amount of tallow and Vinsol which is added to the tall-oil-alkyd resin may be varied over a wide range if provision is made that too much of one in relation to the other is not used. Tallow and Vinsol together amount to from 10% to a maximum which varies from 40% to about 150% of the tall oil-alkyd, which maximum varies with the amount of tall oil in the alkyd. If the amount of these materials added is not the maximum which the particular alkyd will accommodate without losing its binding qualities, the relative amount of each is not important. However, the Vinsol to tallow ratio must be varied according to the tall-oil content of the alkyd if it is desired to introduce the maximum amount of Vinsol and tallow into any particular tall oil-alkyd resin. When the alkyd resin is one which is low in tall oil (i. e., contains around 1/2 mole), the Vinsol to tallow ratio in the mixture of these substances which may be added is about 1:1. When an alkyd resin of high tall oil content (i. e., about 1 1/2 moles) is used, the Vinsol to tallow ratio is about 5:1 in the mixture added. Alkyd resins containing intermediate amounts of tall oil can accommodate ratios which vary directly as the tall oil-content of the alkyd, when the maximum amount of Vinsol and tallow is to be added. Thus, an alkyd resin containing 1/2 mole tall oil will accommodate a maximum of about 40% of equal parts Vinsol and tallow, whereas an alkyd containing 1 1/2 moles tall oil will accommodate a maximum addition of 150% of a mixture of 5 parts Vinsol and one part tallow.

In making the alkyd resin the mixture of phthalic anhydride, glycerol and tall oil in the range of proportions specified is heated between about 190° and 240° C. until a homogenous resin of acid number less than about 100 is obtained. If desired the tallow and Vinsol may be added before the resinification is completed and heating continued. However, it is preferred to introduce them at the end of the reaction. At this stage they dissolve quickly in the hot resin and form a homogeneous composition. Emulsification may be carried out before the final resin has solidified and is convenient since an extra heating step to melt the resin before making the emulsion is avoided. Thus the emulsion may be made in the same kettle in which the resin is formed, if desired.

It is to be understood that other polybasic acids can be used in place of phthalic anhydride and other polyhydric alcohols instead of glycerol. However, such other reactants offer no economic advantage at present and, therefore, the invention is illustrated by the following examples which use phthalic anhydride, glycerol and tall oil to form an alkyd resin, which is mixed with tallow and Vinsol in appropriate amounts. Although the products and the emulsions made therefrom are specified particularly for jute treatment, it is obvious that they have other uses such as paper sizing, textile treatment or (with pigments) as emulsion paints.

*Example 1*

|  | Grams | Moles |
|---|---|---|
| Glycerol | 69 | ¾ |
| Phthalic anhydride | 148 | 1 |
| Tall oil (refined) | 200 | ¾ |

The above mixture is heated together slowly to 210° C. and heating continued at 210–220° until an acid number of about 80 is obtained. At this point the cooled resin is somewhat soft and flexible. The resin is further modified with tallow in amounts up to about 20% and Vinsol up to about 20% (based on the alkyd resin). The composition may be emulsified by methods described later and applied to jute yarn giving useful effects.

*Example 2*

|  | Grams | Moles |
|---|---|---|
| Glycerol | 92 | 1 |
| Phthalic anhydride | 148 | 1 |
| Tall oil (refined) | 300 | 1 |

Heat together and raise temperature slowly to 210° C. until vigorous evolution of water has ceased. Raise temperature to 235–240° C. and heat until acid number is in the range of 25–30. The resin is soft and flexible with very little tack and is quite tough. It is useful for the above described purposes and can be modified to make it much lower in cost by further additions of tallow up to about 30% by weight and Vinsol up to about 90% by weight.

*Example 3*

|  | Grams | Moles |
|---|---|---|
| Glycerol | 184 | 2 |
| Phthalic anhydride | 148 | 1 |
| Tall oil (refined) | 400 | 1½ |

React as in Example 2 until the acid number is about 5 and a soft, sticky resin is obtained, which requires addition of at least 10% of tallow and Vinsol to make it suitable for jute treatment. 15–20% tallow and 75–100% Vinsol added produces resins in a useful range of properties.

Emulsions can be made quite easily using soaps or synthetic emulsifying agents along with common stabilizing agents such as casein and caseinates. Bentonite can also be used for its stabilization properties, and it has been noted that the resins containing Vinsol make more stable emulsions than the unmodified resins.

*Example 4 (Emulsion)*

|  | Grams |
|---|---|
| Finished resin | 100 |
| 10% sodium caseinate soln | 100 |
| Oleic acid | 3.0 |
| Triethanolamine | 1.5 |
| Water | 100 |

The resin is melted in a vessel containing a high speed stirrer, the oleic acid added and the mixture of caseinate solution and triethanolamine is poured in slowly under rapid agitation. The water for further dilution is added as desired to keep a thin enough emulsion to stir and pour readily. A solids content of 30 to 35% has been found most useful for treating the jute fiber.

In carrying out the treating process it is desirable to pass the fiber through a container of the emulsified resin and then through a round die to wipe off the excess material. The amount of resin added is controlled by the resin solids of the emulsion and by the diameter of the die and the most useful added resin weights lie in the range of 10 to 100% of the original jute weight. The coated fiber is preferably dried at below 100° C. in rapidly circulating air in order that the resin does not melt into the fibers and make them rigid. This rigidity may be desired after the yarn is fabricated as for instance in a rug backing and the necessary heating may be applied at this time.

Having thus set forth my invention, I claim:

1. An emulsifiable resinous composition adapted for application to jute fibers to impart sizing, reinforcing and heat-sealing properties thereto, which comprises in homogeneous combination, a resinous extract of pinewood consisting of the gasoline-insoluble resinous portion of the aromatic hydrocarbon-soluble constituents of pinewood, tallow and a reaction product of 1 mole phthalic anhydride, ¾ to 2 moles glycerol and ½ to 1½ moles tall oil; said resinous pinewood extract and tallow together amounting to from 10% to a maximum addition of from 40% to 150% of the said reaction product, the relative amounts of pinewood extract and tallow at the maximum addition thereof ranging from a ratio of 1:1 to 5:1, and the maximum amount of pinewood extract and tallow and the ratio thereof in the mixture varying directly with the amount of tall oil in said reaction product.

2. An emulsion comprising an aqueous dispersion phase and the resinous composition of claim 1.

JOHN W. ROBERTSON.

REFERENCES CITED

The following references are of record in the file of this patent:

UNITED STATES PATENTS

| Number | Name | Date |
|---|---|---|
| 2,146,012 | De Bell | Feb. 7, 1939 |
| 2,352,547 | Jenkins | June 27, 1944 |